US007030578B2

(12) United States Patent
Orsat

(10) Patent No.: US 7,030,578 B2
(45) Date of Patent: Apr. 18, 2006

(54) METHOD FOR CONTROLLING AND REGULATING THE OPERATION OF AN ACTUATOR

(75) Inventor: Jean-Michel Orsat, Chatillon-sur-Cluses (FR)

(73) Assignee: Somfy SAS, Clauses (FR)

( * ) Notice: Subject to any disclaimer, the term of this patent is extended or adjusted under 35 U.S.C. 154(b) by 16 days.

(21) Appl. No.: 10/508,666

(22) PCT Filed: Mar. 21, 2003

(86) PCT No.: PCT/IB03/01207

§ 371 (c)(1),
(2), (4) Date: Sep. 22, 2004

(87) PCT Pub. No.: WO03/083802

PCT Pub. Date: Oct. 9, 2003

(65) Prior Publication Data

US 2005/0140316 A1 Jun. 30, 2005

(30) Foreign Application Priority Data

Mar. 28, 2002 (FR) .................................. 02 03887

(51) Int. Cl.
*H04Q 9/00* (2006.01)
*E06B 9/24* (2006.01)

(52) U.S. Cl. ...................... 318/16; 388/909; 340/545.1

(58) Field of Classification Search .................. 318/16; 388/907.5, 909; 340/531, 539.1, 540, 545.1
See application file for complete search history.

(56) References Cited

U.S. PATENT DOCUMENTS

| | | | | |
|---|---|---|---|---|
| 5,142,396 | A * | 8/1992 | Divjak et al. | 398/108 |
| 5,838,226 | A * | 11/1998 | Houggy et al. | 340/310.11 |
| 5,940,007 | A * | 8/1999 | Brinkmeyer et al. | 340/825.69 |
| 6,634,408 | B1 * | 10/2003 | Mays | 160/188 |
| 6,829,476 | B1 * | 12/2004 | Gelbein | 455/420 |
| 6,925,807 | B1 * | 8/2005 | Jones et al. | 60/721 |

FOREIGN PATENT DOCUMENTS

| | | |
|---|---|---|
| CA | 2299689 | 8/2001 |
| EP | 0687794 | 12/1995 |
| EP | 0718729 | 6/1996 |
| EP | 1091079 | 4/2001 |
| EP | 1172516 | 1/2002 |

* cited by examiner

*Primary Examiner*—Bentsu Ro
(74) *Attorney, Agent, or Firm*—Welsh & Katz, Ltd.

(57) ABSTRACT

The method makes it possible to control and monitor the dynamic operation operation of an actuator intended to drive a movable element of a building protection installation. The actuator is associated with nearby controlling means comprising a power supply device or converter, a local processing unit, and a two-way radiofrequency transmitter, constituting a local actuation unit. The method is characterized in that it consists in transferring to another unit, called the remote processing unit, all or part of the processing for analyzing measurements relating to said actuator and/or to said movable element.

10 Claims, 1 Drawing Sheet

METHOD FOR CONTROLLING AND REGULATING THE OPERATION OF AN ACTUATOR

FIELD OF THE INVENTION

The invention relates to the field of wireless remote control and/or monitoring of actuators intended to provide protection and/or comfort and/or monitoring for a building. It also relates to a control device intended to implement this method.

BACKGROUND OF THE INVENTION

The actuators are, for example, motors controlled by command receivers and intended to operate solar protection devices and closure devices of the building. The command receiving modules for driving the actuators are, according to circumstances, directly incorporated in the actuators, housed in casings above openings, or housed in false ceilings near the actuators. In the best case, in terms of accessibility, the command receiving module is contained in a nearby control box, comprising control push buttons, located close to the actuator, and connected to the latter by wire communication means. In the following text, the term "nearby controlling means" denotes a command receiver and a processing unit which are therefore, according to circumstances, either separated physically from the actuator or incorporated in the actuator.

These command receiving modules are commonly radio receiving modules and may have radio transmission means which enable them, for example, to acknowledge receipt of the received commands and their correct execution.

Since they have these means of communication, the actuators can communicate over a distance with each other and with command transmitters of mobile or fixed types. This communication is carried out according to a common protocol.

At the present time, these devices are suitable for a plurality of applications, and these applications will develop with the development of technology.

This plurality makes it necessary for manufacturers to create numerous versions of actuators and/or nearby controlling means, where each actuator and/or nearby controlling means for providing different functions is made in a specific version. This results in a high cost, without recompense for the user. Thus, for example, a built-in electronic actuator has different functional characteristics according to whether it drives a blind or a roller shutter. Commonly, these will be two different products, although there is no essential difference between them.

The development of technology also tends to make different generations of products incompatible, unless their costs are also increased. Similarly, the frequent difficulty of access to the products impedes any improvement or updating work ("upgrades") of the kind which is common in other fields.

In other fields of the prior art there are known methods for using an external resource by means of a communications network to carry out remote processing. For example, there is a known way of using numerous computers co-operatively in a calculation requiring a large amount of computing power.

In a field more closely related to that of the invention, there are devices for communicating data to a heating, ventilating and/or air conditioning (HVAC) thermal comfort control unit. In simplified terms, heating actuators "transfer" to a central thermostat the decision-making for switching them on automatically and collectively. In modern installations, communication between the heating equipment and the central unit makes use of radio waves. However, this communication does not include any transmission of data relating to the dynamic operation of the heating or air conditioning device (current input, fluid pressure, etc.), as required for dynamic calculations relating to this operation.

In the field of the invention, namely that of actuators for security, closure or solar protection systems for buildings, there are known installations combining actuators with command transmitters communicating by radio, for example in the form of an integrated home system using a carrier current, as described in EP 0,718,729, but this network is hardly used other than for sending out a general command and/or transmitting an acknowledgement of receipt.

Similarly, it is current practice to use a wire or radio network to transmit information on the open or closed state of the different products controlled by the actuators, and even information on their current position. This position information is transmitted on request or periodically. In none of these cases are the data used to enable the movement of the product operated by the actuator to be analyzed by a remote resource communicating by radio with the actuator, in such a way as to control said actuator.

In patent application FR 2,811,703, in order to tackle the problem raised by the present invention, the limit switch control of said actuator is processed in a control box close to the actuator. This control is carried out by analysis of the motor torque. This is an entirely natural arrangement, since this control box is interposed between the mains supply and the actuator: it is logical for the currents supplied to the actuator via this box, and, for example, their phase shift, to be analyzed by processing in this box for the dynamic calculation of an image of the motor torque and consequent detection of the presence of stops. This patent application makes no mention at all of the transfer of this calculation function to another resource accessible via the communication network using carrier currents, and therefore radio frequencies, although such a network is used as a variant in this patent.

The same is true of patent application CA 2,299,689, in which the set of data received from different sensors is processed in a control unit in the nearby control box, although a communication link to an external data processing resource is provided.

In the field of the invention, therefore, it has never been envisaged that the dynamic data relating to the operation of the actuator or of the product connected to it could be transmitted by means of the radio communication link normally used between a remote command transmitter and a nearby means of controlling the actuator, to permit the analysis of the movement of said product and to deduce therefrom the commands to be sent to the actuator.

Application EP 1,091,079 discloses an installation comprising two devices, in which the control of a first device can be transferred to the second device. This control consists of manual control carried out by a user independently of the dynamic operation of the first device.

It has never been envisaged that the existing functionality of said actuators could be improved by remote processing, using a radio communication link, of all or part of their executable programs.

Similarly, it has never been envisaged that actuators could be provided with new functionality, of a type not implemented in these actuators or in their nearby control boxes, by using a remote resource and a radio communication link.

SUMMARY OF THE INVENTION

According to the invention, the various actuators and/or nearby controlling means, contributing to the comfort and/or security of the building, are designed in such a way that they transfer to another unit all or part of the dynamic analysis processing specific to them, this transfer being carried out by means of a two-way radio communication means implemented in each actuator or in the vicinity of each actuator to enable the actuators to be remotely controlled. Thus the method according to the invention enables the actuators of the building to be provided with new functionality which has not been implemented in the equipment or in their nearby controlling means.

Other characteristics and advantages of the invention will be made clear by the following description, with reference to the attached drawings, which are provided solely by way of example and without restrictive intent.

DETAILED DESCRIPTION

Figures 1, 2:
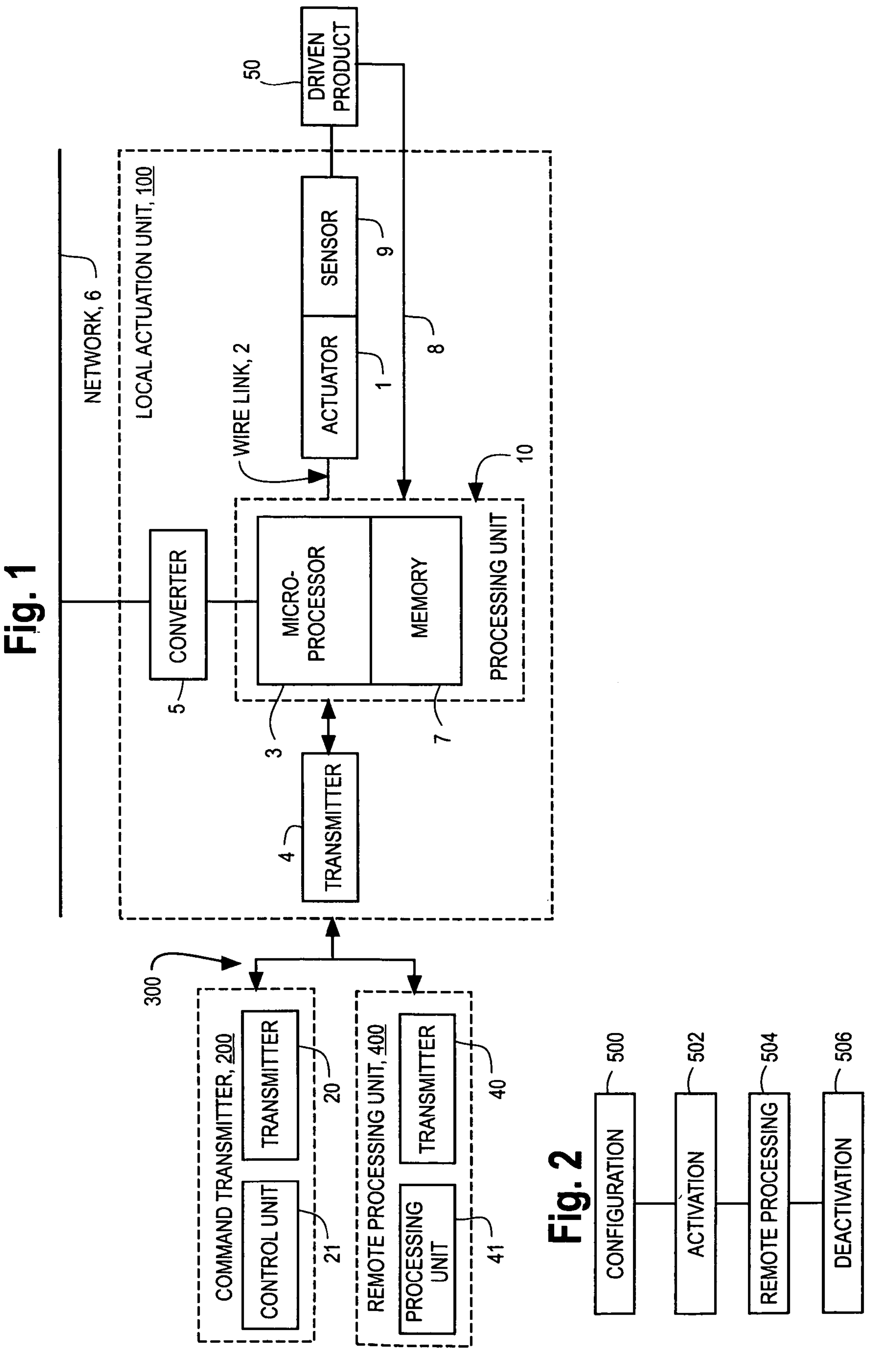
FIG. 1 shows schematically the hardware configuration required for the application of the invention.
FIG. 2 shows in the form of a flow chart the method applicable to the invention.

FIG. 1 shows an actuator (1) which is, for example, an electric motor, intended to drive a movable element (50) such as a door, a rolling shutter, a blind or any other solar protection. This actuator (1) is, for example, connected electrically by a wire link (2) to a local processing unit (10).

This local processing unit (10), containing at least one microprocessor (3), is linked to a radio communication means such as a two-way radio transmitter (4). This radio transmitter (4) can therefore communicate by reception and transmission with any radiofrequency device sharing the same transmission protocol.

The local processing unit (10) executes the programs contained in a memory (7).

The actuator (1) is of the type consisting of a motor for driving doors, ventilation flaps, blinds or various screens for solar protection and the like. It can also consist of a lighting or alarm device to which access is difficult. In this case, the radio transmitter (4) acts essentially as a receiver in normal operation.

One or more sensors are associated with the actuator, either for measuring its torque directly or for measuring parameters (current, voltage, etc.) which enable the torque to be deduced, or for measuring any other locally accessible quantity. These sensors are placed on the motor and/or in a power supply converter (5) or possibly directly on the driven product (50), the arrow (8) representing the return of information from such a sensor towards the local processing unit (10). In FIG. 1, a sensor (9) is incorporated in the actuator (1).

In FIG. 1, which is schematic, the electromagnetic or static switches for supplying power to the actuator in response to the commands of the processing unit are not shown, since all these devices are well known to those skilled in the art.

In the case of an actuator (1) which is not independently powered, as shown in FIG. 1, the system is supplied by a converter (5) from the alternating current network (6).

If the actuator (1) were independently powered, the converter (5) and the alternating current network (6) would be replaced with an independent power source, such as a photovoltaic panel and converter with a battery.

It should be noted that the local processing unit (10), the actuator (1), the converter (5) and the transmitter (4) can constitute a single hardware system which will be termed a "local actuation unit" (100).

Clearly, the elements listed above can be incorporated in the same mechanical system as the motor (1), as shown in FIG. 1, in which case they form an actuator with incorporated electronics; alternatively, they can be mechanically separated from the motor, for example in the form of a nearby control box, in which case the box is provided with push buttons which are not shown.

As indicated above, the local processing unit (10) comprises a microprocessor (3). The latter device comprises a program for activating the measurement means and a program for transmitting measurements. It can also be any type of microcontroller, in which case the memory (7) can be incorporated in the microcontroller. The radio transmitter (4) can contain its own microcontroller for controlling the communication protocol, but this function can be provided by the local processing unit (10) or distributed between the two units, in other words between said local processing unit (10) and the transmitter (4).

A command transmitter (200) is provided, for use in the same communication network represented by two-way arrows (300). It consists of a two-way transmitter (20), similar to the radio transmitter (4), and a control unit (21) for generating commands in response to pressure on push buttons which are not shown.

According to the invention, a remote processing unit (400) is also provided, and constitutes the remote resource. This remote processing unit (400) comprises at least a two-way transmitter (40) similar to the transmitter (20) of the command transmitter (200), and a processing unit (41), comprising a data reception program, a data processing program, and a command transmission program.

According to the invention, there is at least one operating mode of the local processing unit (100) in which the dynamic processing of data relating to the operation of the actuator (1) or to the movement of the movable element (50) is not carried out by the nearby controlling means, in particular the microprocessor (3) and its memory (7), but, at least partially, by the remote processing unit (400), using the radio communication link (300).

The remote processing method can implemented in many ways.

In all cases, it comprises, as shown in FIG. 2, a prior configuration step (500), an activation step (502), a remote processing step (504), a deactivation step (506).

In a preferred embodiment, on which the description is based, the actuator (1) and the system formed by its nearby controlling means, consisting of the local actuation unit (100), do not support any automated function. For example, the controlling means of the processing and activating communication unit cannot detect an end stop or an obstacle during operation, and similarly it cannot react to a movement of the movable element (50) if the actuator (1) is not switched on (in the case of a roller shutter, this movement might indicate an attempted break-in, or in the case of a blind the movement might indicate a gust of wind, etc.). However, the local actuation unit (100) comprises sensors whose values can be analyzed in respect of their variation and combination to provide information on said movement.

In its simplest form (which also implies the lowest possible production cost), the local actuation unit (100) is therefore such that it can receive and execute commands from the radio link and can transmit data relating to the measurements of said sensors.

The prior configuration step (500) consists in configuring the local actuation unit (100) under the control of the remote processing unit (400), waiting for the initiating event, and receiving data. This step consists, for example, in defining an initiating event as well as the data to be transmitted and their sampling frequency. It is normally initiated by a remote processing unit (400). Using a special communication frame, of the "Request Data" type, this unit remotely enters information into the memory (7) of the local actuation unit (100), for example the answers to the following:

What data are to be transmitted?

At what sampling frequency?

On the occurrence of what initiating event?

Up to what final event?

By way of example, a configuration command is sent, according to which, from the motor start-up command, in a first direction of rotation, the values of the voltages applied to the two windings of said motor are transmitted every 10 milliseconds, and this transmission is halted if the stop command is activated.

In another example, in the case of a direct current motor, a configuration command is given, according to which, as soon as the motor has been set to standby, the value of the voltage applied across the stator terminals is transmitted every 2 seconds, and this transmission is halted as soon as the motor is switched on.

The prior configuration can be hardwired, but this deprives the product of the flexibility provided by the invention. For example, it would be possible for the initiating event and/or the data to be transmitted to be defined in advance. A compromise can be reached if required between a partial set of data selected once for all and a partial set of data selected in a variable way. It should be noted that the prior configuration step (500) can be changed a number of times for a single local actuation unit (100), and that it is possible to specify a plurality of transmission parameter sets, linked to different initiating events. Finally, a single prior configuration step (500) can include the collective configuration of a plurality of identical local actuation units (100).

The activation step (502) consists in the activation of the next processing step (504). This step consists in the recognition by the local actuation unit (100) of the initiating event defined in the prior configuration step (500) and the execution by the local actuation unit (100) of the commands linked with this initiating event. For example, the local actuation unit (100) receives a lifting command from the command transmitter (200) and starts the motor in the first direction of rotation. It is also conceivable that the control command transmitted by the command transmitter (200) could in fact be acquired by the remote processing unit (400) and retransmitted to the local actuation unit (100) by this said remote unit (400).

The remote processing step (504) consists of:

in the case of the local actuation unit (100):

measuring and transmitting the measurement made;

waiting for a command;

looping over to the next measurement, at the sampling frequency;

and in the case of the remote actuation unit (400):

receiving the measurement;

carrying out the processing and testing the result of the processing;

looping over to waiting for the next measurement to be received, if the test is negative.

The processing step (504) consists for example, in the case of the local actuation unit (100), of transmitting the requested data to the remote unit (400) at the requested sampling frequency. These data are therefore received and processed by the remote processing unit (400) which has a greater processing capacity than the local actuation unit (100). For example, the use of a complex algorithm for dynamically comparing the variations of the voltages applied to the terminals of the two windings of the motor yields a precise image of the motor torque.

This processing does not have to be completely simultaneous with the sampling. Consequently, the inevitable conflicts or interference during the radio transmission do not excessively perturb this transmission. A robust algorithm can compensate for the absence of any one or more data elements.

The deactivation step (506) is initiated by the remote unit. This deactivation step of the processing step (504) consists of:

in the case of the remote actuation unit (400):

generating a control command if the test is positive;

transmitting this command;

and in the case of the local actuation unit (100):

receiving the control command;

and executing the command.

For example, when the processing unit (41) of the remote unit (400) detects by calculation, for example, an abrupt change of torque, the remote unit (400) sends a stop command. This command is either transmitted directly to the local actuation unit (100), or transmitted to the command transmitter (200) which immediately relays it to the local actuation unit (100).

If the capacity of the communication network permits, and if the computing power of the remote unit (400) is sufficient, this unit (400) can simultaneously execute different algorithms relating to a plurality of simultaneously activated actuators.

Similarly, a plurality of remote units (400) can be polled to share a single complex processing operation.

Finally, it is clear that the command transmitter (200) and the remote processing unit (400) can constitute a single unit, for carrying out both the remote control and the remote processing operations.

Clearly, the invention is not limited to the embodiments described and illustrated by way of example, but comprises all technically equivalent solutions and their combinations.

The invention claimed is:

1. A method of controlling and monitoring the dynamic operation of an actuator intended for driving a movable element of a protection and/or comfort and/or monitoring installation for a building, said actuator being associated with nearby controlling means which comprise a supply device or converter, a local processing unit, and a two-way radio frequency transmitter, constituting a local actuation unit, which method consists in diverting to a remote processing unit, all or part of the processing for analyzing measurements relating to said actuator and/or to said movable element (50).

2. The method as claimed in claim 1, wherein the measurements relate to a phase in which the actuator is electrically powered.

3. The method as claimed in claim 1, wherein the measurements relate to a phase during which the actuator is not electrically powered.

4. The method as claimed in claim 1, further comprising a remote processing step comprising at least:

in the case of the local actuation unit, the following steps:

measuring and transmitting the measurement made;

waiting for a command;

looping to the next measurement, at the sampling frequency;

and in the case of the remote actuation unit, the following steps:

receiving the measurement;

carrying out the processing and testing the result of the processing; and looping to waiting for the next measurement to be received, if the test is negative.

5. The method as claimed in claim 1, further comprising an activation step which, in the case of the local actuation unit includes recognizing the initiating element defined in a prior configuration step and in executing the commands associated with this initiating event.

6. The method as claimed in claim 1, further comprising a prior configuration step which consists in configuring a local actuation unit under the control of the remote processing unit and in the case of the local actuating unit, waiting for the initiating event and, in the case of the remote processing unit, waiting for the data to be received.

7. The method as claimed in claim 6, wherein the nature of the initiating event and/or the nature of the data to be measured and transmitted and/or the value of the sampling frequency are transmitted from the remote processing unit to the local actuation unit during the prior configuration step.

8. The method as claimed in claim 6, wherein the nature of the initiating event and/or the nature of the data to be measured and transmitted and/or the value of the sampling frequency are defined in a pre-established manner in the local actuation unit.

9. The method as claimed in claim 1, further including a deactivation step comprising:

in the case of the remote actuation unit, the following steps:

generating a control command if the test is positive;

transmitting this command;

and in the case of the local actuation unit, the following steps:

receiving the control command; and executing the command.

10. A device for the remote control of an actuator to implement the method as claimed in claim 1, wherein the actuator drives a shading or closure element, and wherein said device comprises a two-way transmitter, measurement means, and a local processing unit further comprising a microprocessor, comprising a program for activating the measurement means and a program for transmitting the measurements, and wherein said device comprises a remote processing unit comprising a two-way transmitter and a processing unit comprising a data reception program, a data processing program, and a command transmission program.

* * * * *